Nov. 30, 1971  R. H. REYNOLDS ET AL  3,623,306
RECIPROCATING FRUIT HARVESTER
Filed June 3, 1970  3 Sheets-Sheet 2
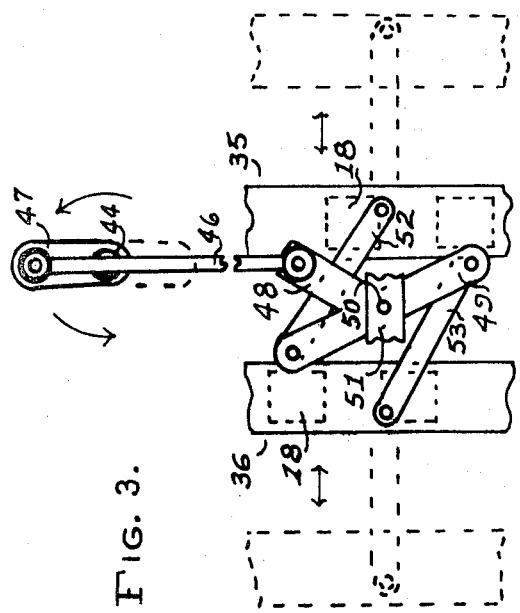
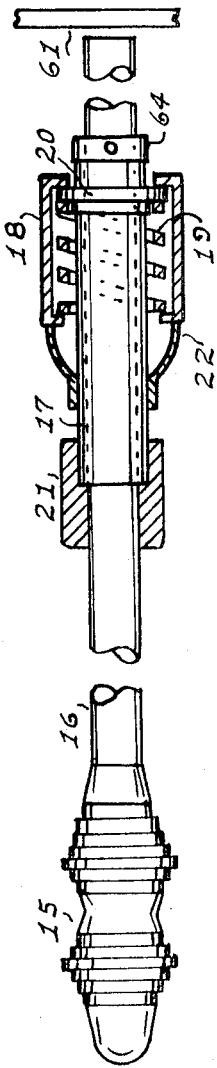
INVENTORS
ROBERT H. REYNOLDS
ELMO M. REYNOLDS

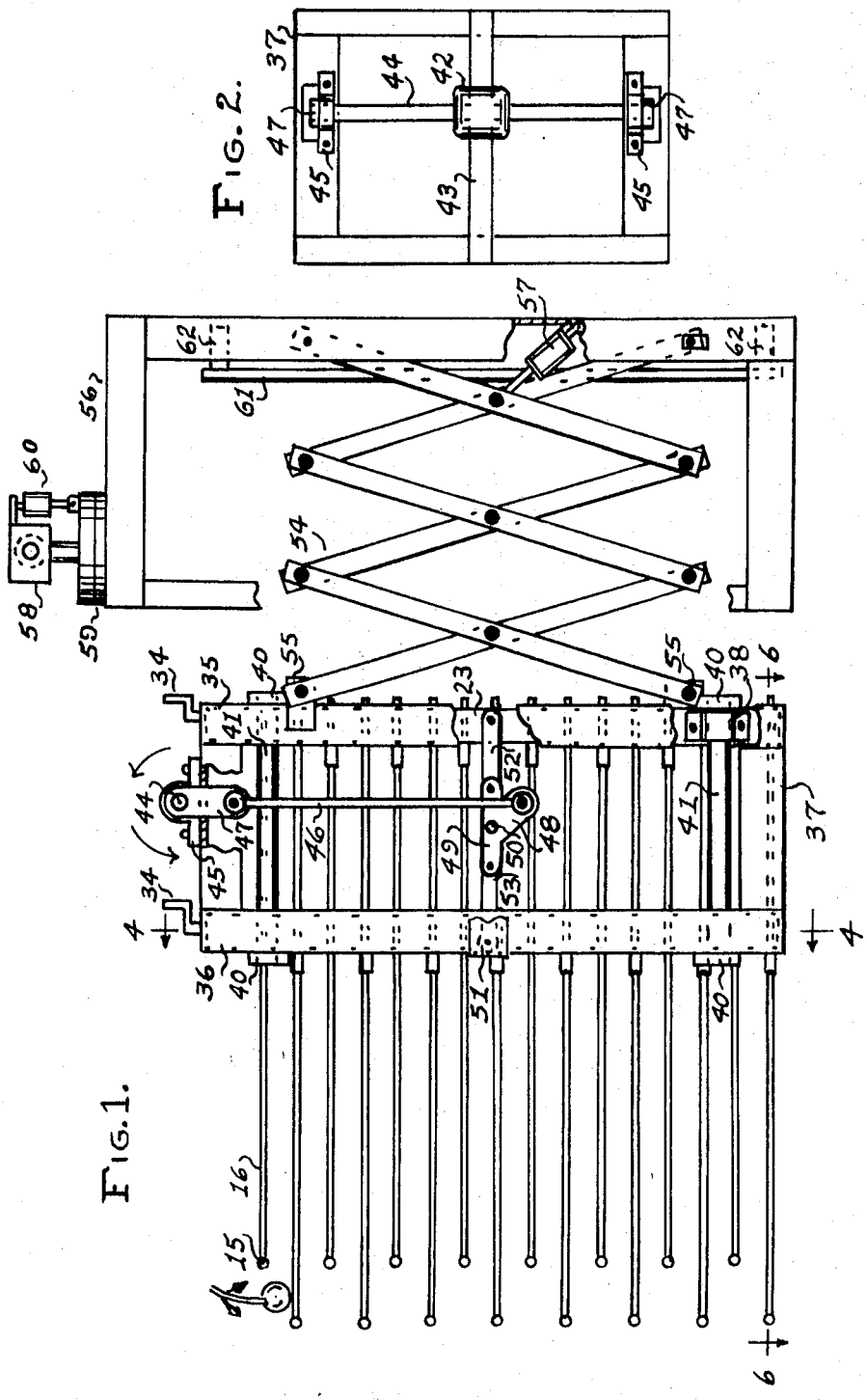

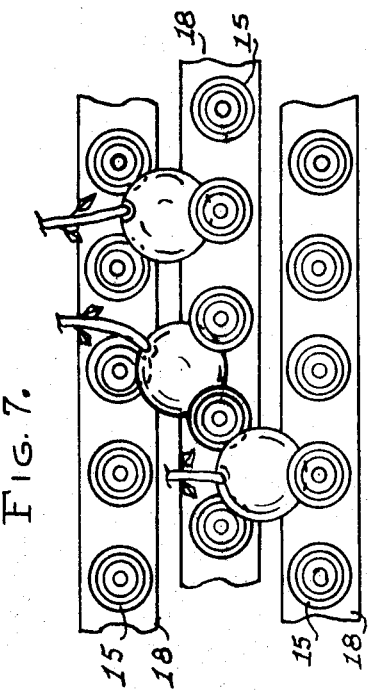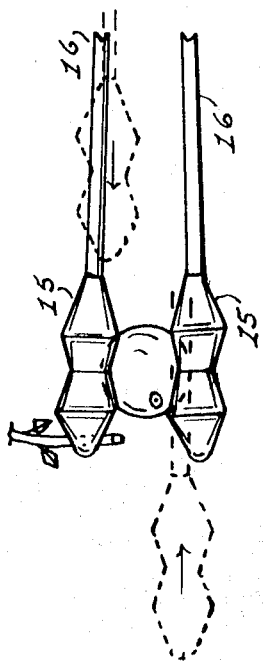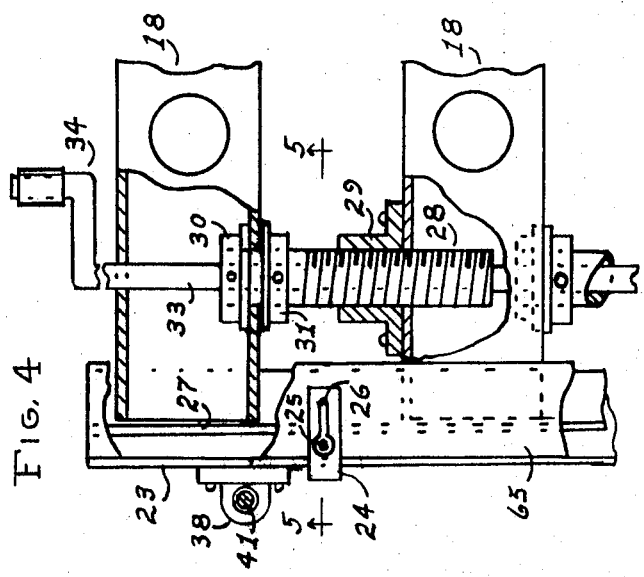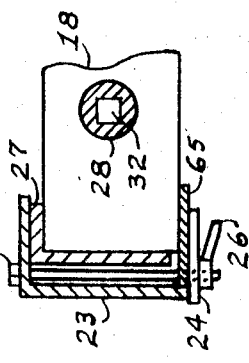

United States Patent Office 3,623,306
Patented Nov. 30, 1971

3,623,306
RECIPROCATING FRUIT HARVESTER
Robert H. Reynolds and Elmo M. Reynolds, Hillsborough County, Fla. (both of 810 South Dakota Ave., Tampa, Fla. 33606)
Filed June 3, 1970, Ser. No. 43,124
Int. Cl. A01g 19/08
U.S. Cl. 56—328
7 Claims

ABSTRACT OF THE DISCLOSURE

The instant device comprises groups of picking heads supported by tubes mounted on support bodies and having means to continuously reciprocate all picking heads in an axially manner, a group of said heads whereas when advanced into a tree a piece of fruit is grasped between said picking heads and rotated to separate said fruit from its stem.

---

The instant device relates to an improved fruit harvester constituting improvements over the invention shown and described in application Ser. No. 674,955, filed Oct. 12, 1967, and now Pat. 3,534,535.

An important object of the present invention is to provide an easy means of changing the relative distance between each horizontal row of picking heads for the purpose of harvesting different kinds of fruit such as oranges, grapefruit, lemons, etc.

Another important object of the present invention is to provide a greater degree of movement transversely of the picking heads and supporting tubes to better adjust to the various sizes of a particular kind of fruit.

Another important object of the present invention is to provide means of reciprocating movement for all picking heads to reduce picking time.

Another further important object of the present invention is to provide a back-stop means for the purpose of resetting tubes which are forced backwardly, due to becoming stymied in a tree, from their respective operating positions in the tube support body.

Still another improved object of the present device is to provide means of turning the harvester horizontally on its auxiliary supporting means from one side of grove row to the other side of row for purpose to decrease picking time.

Other important objects and advantageous features of the present invention will be apparent from the following description and the accompanying drawings, wherein, for purpose of illustration only, a specific form of the invention is set forth in detail.

In the drawings:

FIG. 1 is a side elevational view of harvester unit in a forwardly extended manner from the main support frame.

FIG. 2 is a top plan view of the movable support body.

FIG. 3 is a side elevational view of an enlarged portion of mechanism for the purpose of reciprocating tube supporting bodies and showing said bodies in an inwardly manner as opposed to an outwardly manner in FIG. 1.

FIG. 4 is a side elevational enlarged sectional view taken on the line 4—4 of FIG. 1 and showing the construction of mechanism for the purpose of changing the relative distances between tube support housings.

FIG. 5 is a sectional view taken on the line 5—5 of FIG. 4 showing means of clamping the tube support housing to its support frame.

FIG. 6 is a sectional enlarged view taken on the line 6—6 of FIG. 1 showing the mechanism disposed in the tube support housing.

FIG. 7 is a front elevational view of a portion of a plurality of the fruit picking heads and including therein a diagrammatic showing of the separation of fruit from its stem.

FIG. 8 is a side elevational view of picking heads reciprocating in opposite directions including therein a diagrammatic showing of the separation of fruit from its stem.

Referring in detail to the drawings, wherein, like and related numerals designate like and related parts, the present device comprises a plurality of heads supported on tubes arranged in horizontal rows. Said rows comprise the top row secured to one tube support body, a second row secured to the other tube support body, a third row secured to the first mentioned tube support body and this sequence is followed for the number of said rows desired. Each said body reciprocates respectively in opposite axially direction.

In FIGS. 1 and 6, picking heads 15 are secured to support tubes 16. Each tube is slidably disposed in a sleeve 17. One end portion of each sleeve is movably disposed in a large aperture on one side of the tube support housing 18 and the said one end of said sleeve is disposed through another smaller aperture on the other side of said housing. The periphery of sleeve 17 is maintained in housing 18 by tension of spring 19. One end of said spring is against the internal wall surrounding the larger aperture of said housing and the other end is compressed against shoulder 20 which is fixed to said sleeve. This compression forces said shoulder firmly against internal wall which surrounds and defines the smaller aperture of said housing. Frictional ring 21 is fixed on the other end of sleeve 17 and frictionally engages tube 16. Flexible cover 22 secured to said sleeve and frictionally engaging the external wall of said housing is for the purpose of preventing tree trash to enter said large aperture. Each tube is prevented from being forced too far forwardly in sleeve 17 when collar 64 secured to said tube strikes one end of said sleeve.

In FIGS. 4 and 5, housing 18 is clamped on one end within support body frame 23 by clamping means comprising plate 24, bolt 25, securing nut 26 and holding plate 65 and the other end of said housing is clamped by identical means. Said clamps are spaced sufficiently in numbers on said frame to secure all of said housings in a like manner. Spacer angle 27 having its narrow side fixed to frame 23 is for the purpose of a placement guide for said housing. The other end of said housing is guided by identical means. To provide means for changing the relative distance between each of said housings a threaded circular elongated spacer 28 is disposed movably in a compatible threaded female fitting 29 which is fixed to the upper side of housing 18 near one end. The upper one end of said spacer is disposed in an aperture in the lower side of another housing 18 and is maintained there by collars 30 and 31 in a movable manner. The internal portion of said spacer is formed whereas a square aperture 32 is provided through the entire length of said spacer. The square adjusting rod 33 having a crank 34 on the upper one end, is slidably disposed in aperture 32 and extends downwardly into other similar housings having identical means as herein described. The rotating of said rod in one direction rotates spacers 28, after said clamping means have been loosened, such that the threaded mechanisms change the relative distance of said housings to a closer relationship to each other and the rotating of said rod in the other direction changes the relative distance of said housings to a farther apart relationship to each other. After making said changes, said clamping means are tightened. Said mechanism is provided for each end of said housing and for all similar housings in identical manner.

In FIGS. 1 and 3, a desired number of picking heads 15, their support tubes 16 and tube support housings 18 are arranged in two movable tube support body groups. One is referred to hereafter as body 35 and the other as body 36. Both are identical in structure and performance. Each said body is disposed in an identical frame 23. Said bodies are maintained, in an opposing manner within movable support body 37, on four separate shafts 41 and are adapted to move forwardly and backwardly there-on by means of bearings 38 fixed respectively to all four side elevational corners of respective frames 23. Said shafts are disposed in said bearings. Collars 40 are fixed on body 37 in alignment with each end of respective said shafts which are secured thereto.

In FIGS. 1, 2 and 3, hydraulic motor 42 secured to structural member 43 is activated by an auxiliary source and is continuously rotated in one direction during harvesting. Said motor is fixed to shaft 44 having one end of said shaft disposed in movable manner into and through bearing 45 which is secured to frame 37 and the other end is adapted in identical manner. Connecting rod 46 having one end connected in a movable manner to one end of crank 47 which has its other end fixed to shaft 44 and said rod having its other end connected to extension arm 48 in a movable manner which is fixed to rocker arm 49, provides means of activating said extension arm in an upwardly and downwardly movement. Said rocker arm is supported in a movable manner on shaft 50 which is secured to structural member 51. Said member is fixed to frame 37. Connecting link 52 has one end pivotally connected to tube support body 35 and its other end connected in identical manner to one end of arm 49. Connecting link 53 is pivotally connected at one end to tube support body 36 and the other end of said link is pivotally connected to the other end of arm 49. Thus by activation of motor 42 said bodies are moved in a reciprocating manner in opposite directions in relationship to each other horizontally within frame 37 and are slidably supported on shafts 41. The above described mechanism is provided on each side of said frame and said bodies in identical manner.

In FIG. 1, a piece of fruit is shown in contact with picking heads 15. In FIG. 8 said fruit is shown, whereas, it has been rotated by said heads and separated from its stem. As indicated by arrows the two heads, each supported by a separate said tube support body from the other, move in an axially manner in opposite directions which provides a faster picking cycle. The drawing shows the slight movement transversely of said heads and tubes due to a large piece of fruit being in the grasp of and between said heads, and shows the oblique manner of the heads and tubes in relationship to the phantom drawings of same which are in non-picking position before contacting fruit. In FIG. 6, spring 19 provides the means of said movement transversely.

In FIG. 1, frame 37 is supported by scissors linkage 54 which has the means of expanding outwardly and contracting inwardly in a horizontal manner. Said scissors linkage is pivotally attached to structural members 55 which are fixed to frame 37 and the other end is attached in a movable manner to main frame 56. Hydraulic cylinder 57 is movably connected to said frame and to said scissors linkage and is activated by an auxiliary source for the purpose of moving the picking heads 15 into and out of a tree. Main frame 56 is supported by an auxiliary maneuvering support 58. Hydraulic motor 59 activated by an auxiliary source having its lower movable portion fixed to said frame and its upper non-movable portion movably connected to said support provides the horizontal turning around movement of the said picking heads for purpose of picking fruit in trees on each side of grove rows. Thus, time is reduced by picking more tree coverage from one position of the ground supporting vehicle. Hydraulic cylinder 60 is movably connected to said support and to upper portion of motor 59 for the purpose of leveling or slanting the said picking heads as desired.

In FIGS. 1 and 6, back-stop panel 61 secured to frame 56 by resilient means 62 provides means of stopping the backwardly movement of a tube 16 which had been forced backwardly through frictional ring 21 due to becoming stymied during the movement of heads 15 into a tree. Said tube strikes said panel when its respective tube support body is moved backwardly toward said panel and, thus, stops said tube for a dormant period during said movement, whereas, friction ring 21 is moved backwardly on said tube until the picking operating position of said tube is reached in said ring.

In FIG. 7, fruit is shown in the grasp of picking heads 15. The top and bottom rows of said heads and their tube support housings 18 are a portion of tube support body 35 and the second row of said heads and housing 18 is a portion of tube support body 36.

Although there have been shown and described herein preferred forms of the invention, it is to be understood that the invention is not necessarily confined thereto, and that any change or changes in the structure of and in the relation arrangements of components thereof are contemplated as being within the scope of the invention as defined by the claims appended hereto.

What is claimed is:

1. A fruit harvesting unit comprising a main support body, a movable support body mounted on said main support body, two movable tube support bodies mounted on said movable support body, means mounted on said movable support body and connected to said two movable tube support bodies so as to reciprocate said two movable tube support bodies in opposite directions, at least two elongated tubes having one end mounted on one body of the said two movable tube support bodies, a fruit contacting head mounted on the other end of each said tube, at least one elongated tube disposed adjacent said first mentioned tubes and having one end mounted on the other said movable tube support body and free end disposed beyond said heads on said first mentioned tubes, a fruit contacting head mounted on the said free end of tube and defining with first mentioned heads an area for receiving individual pieces of fruit for harvesting such that upon the disposal of a piece within said area and axially movement of said first mentioned movable heads relative to the opposite axially directed movement of said other mentioned movable head, said piece of fruit is contacted by said heads, rotated and in the process is separated from its stem.

2. The device according to claim 1 wherein expanding and contracting means are connected to said main support body and connected to said movable support body for moving said heads toward and away from a tree.

3. The device according to claim 1 wherein a tube support housing mounts one end of a sleeve about which is disposed a tension compression spring, and said sleeve adapted to slidably receive one of said mentioned tubes.

4. The device according to claim 3 wherein means are connected between at least two of said tube support housings for changing the relative distance between the two said tube support housings.

5. The device according to claim 1 wherein a panel mounted on said main frame is adapted to stop the movement of at least one said tube.

6. The device according to claim 1 wherein a turning means is connected to said main body and connected to said main body auxiliary supporting means for revolving horizontally said main body relative to said supporting means.

7. The device according to claim 6 wherein a vertical means is connected to said revolving means which is secured to said main frame and connected to said supporting means for purpose of leveling or slanting said harvesting unit.

References Cited

UNITED STATES PATENTS

| | | | |
|---|---|---|---|
| 3,129,551 | 4/1964 | Lasswell, Jr. | 56—328 R |
| 3,153,311 | 10/1964 | Pool | 56—328 R |
| 3,347,587 | 10/1967 | Frost | 56—328 R X |
| 3,458,982 | 8/1969 | Lasswell, Jr. | 56—328 R |
| 3,483,687 | 12/1969 | Tanner, Jr. | 56—328 R |
| 3,561,205 | 2/1971 | Baker | 56—328 R |

RUSSELL R. KINSEY, Primary Examiner